United States Patent [19]
Schnell et al.

[11] 3,940,653
[45] Feb. 24, 1976

[54] ARC DISCHARGE DEVICE, IN PARTICULAR A PLASMA BURNER

[75] Inventors: Claude R. Schnell, Brig; Kurt Hengartner, Visp; Heinz Gross, Brig, all of Switzerland

[73] Assignee: Lonza Ltd., Gampel, Valais, Switzerland

[22] Filed: Sept. 6, 1974

[21] Appl. No.: 503,869

[30] Foreign Application Priority Data
Sept. 19, 1973  Switzerland.................. 13476/73

[52] U.S. Cl. .................. 314/69; 219/121 P
[51] Int. Cl.² .......................... H05H 1/26
[58] Field of Search ............ 314/68, 69; 219/121 P; 13/18

[56] References Cited
UNITED STATES PATENTS

| | | | |
|---|---|---|---|
| 2,398,355 | 4/1946 | Bristol | 314/68 |
| 2,700,119 | 1/1955 | Krell | 314/69 |
| 3,830,997 | 8/1974 | Essers | 219/121 P X |

*Primary Examiner*—R. N. Envall, Jr.
*Attorney, Agent, or Firm*—Toren, McGeady and Stanger

[57] ABSTRACT

An apparatus for feeding a bar electrode to a plasma burner wherein the electrode is advanced and rotated by a roller having its axis inclined at an acute angle relative to the surface of the electrode.

9 Claims, 5 Drawing Figures

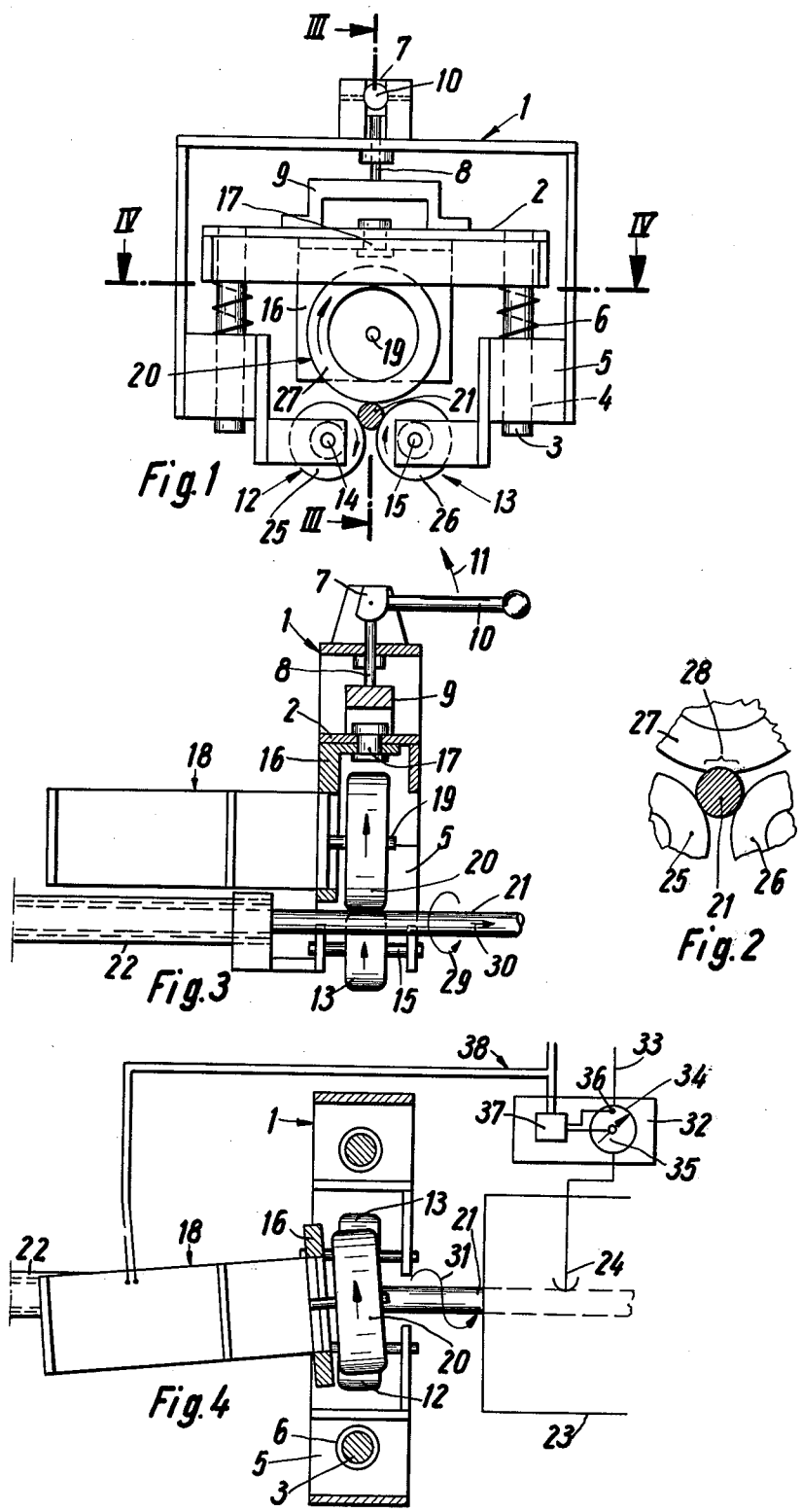

ARC DISCHARGE DEVICE, IN PARTICULAR A PLASMA BURNER

The invention relates to an arc discharge device, in particular a plasma burner, and is concerned with the retention and feeding of a bar electrode of the device.

In such devices, an electrode must be retained in a longitudinally movable manner enabling both the adjustment of the electrode distance and the repositioning necessitated by the burning away of the electrode. In the case of discharge devices, the arc of which burns in a chamber, in particular in the case of plasma burners, the plasma pressure in the chamber exerts a force on the electrode tending to push the electrode out of the chamber. Consequently the electrode must be firmly held.

From the German Published Specification No. 1,255,834 it is known for a bar electrode of a plasma burner to be inserted in one end of a bar-shaped electrode holder which is supported in a movable manner for the longitudinal adjustment of the electrode, but secured against turning and provided with an external thread that engages in the internal thread of a manually rotatable but axially fixed setting head.

In this way the electrode is firmly held, since the thread is self-locking in relation to the axial pressure exerted on the electrode by the plasma, but the feeding range is restricted. After consumption of the electrode, the electrode holder must be taken out and equipped with a new electrode. Since in practice the electrode does not burn away symmetrically, the discharge becomes unsymmetrical during operation of the device. The thinner the electrode, the less pronounced the lack of symmetry of the discharge becomes. However, for any given burner performance, thinner electrodes are subjected to higher specific loadings which lead to their burning away more rapidly, and requiring their more frequent replacement.

In the case of arc lamps serving as a source of light, it is known for a clock or an electrical controller to be provided for feeding an electrode. The controller has a lever mechanism with one electro-magnet disposed in series or in parallel relative to the arc or two electromagnets, of which one is in series with and the other in parallel with the arc (main current, induction current differential lamps respectively). The clock functions independently of the electrode eroding or burning away, the controller has a restricted feeding range, and unsymmetrical erosion of the electrode cannot be avoided.

It is the object of the invention to hold the bar electrode of an arc discharge device so that it does not deflect even from the plasma pressure of an arc burning in a chamber, to prevent the electrode burning away unsymmetrically, and to feed the electrode forward at an adjustable or controllable speed over a range not restricted by the holding and feeding means.

This object is attained in accordance with the invention in that a bar-shaped electrode is caused to rotate about its axis and is fed forward in its longitudinal direction by means engaging directly on the outer surface of the electrode.

Preferably the cylindrical bar electrode is rotatably supported and is axially displaced relative to a driving roller connected with a driving means, the axis of the driving roller being inclined at an acute angle relative to the longitudinal axis of the bar electrode, whereby part of the covering surface of the driving roller elastically deformed through pressure on the bar electrode engages the electrode.

In one examplary embodiment of a device in accordance with the invention, the bar electrode is supported on two freely rotatable supporting rollers parallel to its axis, the hard covering surfaces of which bear frictionally along the lines of contact of the supporting rollers and the bar electrode.

In this way the following features and advantages are obtained, which are also applicable to the other forms of embodiment of the invention:

The bar electrode is held in a predetermined attitude, since it bears on a contact line upon the hard covering surfaces of the two supporting rollers. The electrode is axially fixed, since it has a static frictional, that is, transmissionally positive, surface contact with the driving rollers. In this way the electrode is also prevented from deflection by the plasma pressure of an arc burning in a combustion chamber. The drive of the obliquely disposed driving roller and its static frictional contact on the electrode surface effect forward feeding and an associated enforced rotation of the electrode about its axis. In the forward feeding, the electrode slides on the two supporting rollers, since it has a sliding frictional contact with these. In the rotation, the electrode takes with it the freely rotatable supporting rollers, so that only rolling friction then occurs. Through the rotation of the electrode a symmetrical erosion or burning away is attained and an arc discharge is obtained that is rotationally symmetrical relative to the electrode axis. The rotation is determined by the rotational speed of the driving roller and the circumference of the electrode, and the forward feed at a given rotational speed of the driving roller is determined by the angle at which the axis of the driving roller is relative to the axis of the electrode, so that rotation and forward feed of the electrode can be adjusted independently. Thus it is in particular possible for the feed to be regulated automatically in relation to the arc current or the arc voltage. The retention and feeding device has no restricted control range. Since the disposition of the rollers does not restrict the space receiving the electrode in a longitudinal direction, it is possible, through the use of electrodes referred to later that can be stuck or screwed onto one another, for the arc discharge device to be operated without interruption, in that in good time before the consumption of an electrode the next electrode can at any time be introduced into the device. The co-axial locations of the two electrodes in the transition from one to the other is then ensured through the two supporting rollers.

One embodiment of the invention will now be described in more detail on the basis of the attached drawing, which shows in:

FIG. 1 a front elevation of a holding and feeding device for a bar-type electrode of a plasma burner;

FIG. 2 a detail of FIG. 1 on a larger scale;

FIG. 3 is a partly cut-away section on the line III—III of FIG. 1; and

FIG. 4 is a partly cut-away plan-view section on the line IV—IV in FIG. 1, with further parts of a plasma burner.

Figure 5:
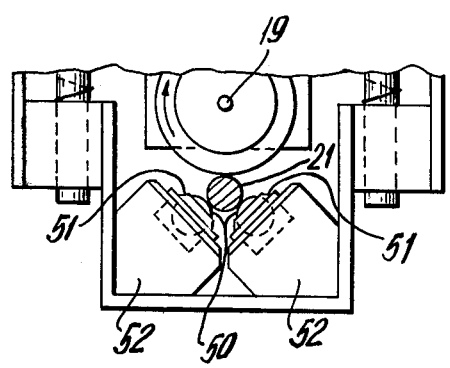
FIG. 5 is a partial frontal view of another embodiment of the feeding device of the present invention.

The device illustrated has a casing frame 1, in which a vertically displaceable traverse 2 is disposed. The traverse 2 is provided with guide pins 3, which are guided axially in guide holes 4 of frame parts 5. Compression springs 6 bias the traverse 2 upwards. The pressure force of the springs 6 is taken by a cam disc 7. A longitudinally displaceable pin 8 is carried in the frame 1 and abuts with one end the cam disc 7 and with the other end a yoke 9 joined to the traverse 2. The cam disc 7 can be turned by means of a lever 10. When the lever 10 is swung upwards in the direction of the arrow 11 (in FIG. 3) the traverse 2 is lifted by the springs 6 by an amount determined by the position of the cam disc 7. If the lever 10 is swung back again, then the traverse is lowered against the bias of the springs 6 back into the illustrated position.

In the lower part of the frame 1 two similar freely rotatable supporting rollers 12 and 13 are carried, the axes 14 and 15 of which run in a plane perpendicular to the frame surface (that is in FIGS. 1 and 2 the drawing plane.). On the underside of the traverse 2 is a carrier 16 fixed for rotation about a vertical pivot pin 17. The carrier 16 carries a geared motor 18, on a driving shaft 19 of which a driving roller 20 is located centrally above the supporting rollers 12 and 13. The diameter of this driving roller 20 is greater than that of the supporting rollers 12 and 13, its shaft 19 runs parallel to the common plane of the axes 14 and 15 of the supporting rollers 12 and 13. The carrier 16 is turned about the pivot pin 17 such that the shaft 19 runs obliquely to the axes 14 and 15, for example at a small angle of 5°.

In the interspace between the three rollers 12, 13 and 20 is disposed a bar-type carbon electrode 21, which passes through a sleeve 22, (the inside diameter of which is greater than the diameter of the electrode 21) at one side of the frame 1, and at the other side of the frame 1 penetrates into the plasma burner casing 23. A plasma burner for use with the present invention can be that shown and described in U.S. Pat. No. 3,712,996 to Kugler, which patent was granted on Jan. 23, 1973. A sliding contact 24 bears against the electrode 21 within the burner casing to supply current thereto. The end of the electrode which penetrates into a combustion chamber not shown. In relation to the electrode 21 the axes 14 and 15 and the shaft 19 are displaced by 120° one from another. The axis of the electrode 21 runs parallel to the axes 14 and 15.

The supporting rollers 12 and 13 have coverings 25 and 26 respectively of a polyacetal of a known type, commercially known as "DELRIN." This material is hard, so that the supporting rollers 12 and 13 each make a line contact with the electrode 21. The friction coefficicient between this polyacetal and the carbon of the electrode is small, so that the electrode can slide parallel to the axes of the supporting rollers 12 and 13, since carbon has lubricant properties. Obviously other materials of suitable hardness and slip characteristics, such as, for example, steel, could be used for the coverings 25 and 26. The driving roller 20 has a covering 27 of a rubber-like material, it is disposed at such a distance from the supporting rollers 12 and 13 that the electrode 21 which is firmly supported by these pushes somewhat into the covering 27 of the driving roller, so that this covering makes a surface contact on the electrode 21, (as FIG. 2 shows in which the contact area is indicated at 28). Here the frictional coefficient between the rubber-like material of the covering 27 and the carbon of the electrode 21, and also the force with which this material is pressed elastically onto the carbon, are so great that the driving roller 20 bears on the electrode 21 with adhesion friction. The greater diameter of the driving roller 20 is advantageous for the surface contact with the electrode 21. Only the coverings, as shown, of the rollers 12, 13 and 30 can consist of the materials having the properties mentioned, or alternatively the entire rollers can be of such materials. Here electrically insulating materials have an advantage, to keep the bar-type electrode 21 insulated. If the rollers 12 and 13 are of steel and the bar-type electrode 21 is not earthed, the axes of the rollers would need to be suitably insulated.

For so long as the described holding and feeding device does not retain an electrode, part of the covering 27 of the driving roller 20 intrudes somewhat into the space between the rollers 12, 13 and 20 provided for the electrode, since in this condition the covering 27 is not elastically deformed. In order to ease the introduction of an electrode into this space, the driving roller 20 is lifted by swinging the lever 10 upwards so that the electrode 21 can be introduced by sliding it along the supporting rollers 12 and 13 without meeting the driving roller 20. Thereafter, the lever 10 is swung downwards and the driving roller 20 pressed against the electrode 21, the covering 27 being deformed as shown in FIG. 2. While the electrode 21 is being consumed by burning away, a second can be pushed in behind it without it being necessary to lift the driving roller 20 for the transition from one electrode to the next. It is particularly advantageous if each electrode has a spigot at one end and a hole matched to this at the other, or a threaded extension and a hole with a female thread, so that the electrodes can be pushed or screwed onto one another.

When the driving roller 20 is driven by the geared motor 18 it carries with it the electrode 21, on which it bears with static friction in the zone of the contact surface 28. In this way the electrode 21 is rotated, and the freely rotatable supporting rollers 12 and 13 run with it. As a result of the oblique attitude of the driving roller 20 in relation to the electrode 21 the motion of the electrode 21 has in addition to the rotational component 29 a thrust component 30 also (FIG. 3). Through this the electrode 21 slides along the lines of contact at which it touches the supporting rollers 12 and 13. The resultant movement of the electrode is a screwing movement 31 (FIG. 4).

The rotational component 29 of the electrode movement is dependent on the rotational speed of the driving roller 20; is adjusted so that symmetrical burning away or erosion of the electrode is ensured. The foreward feeding component 30 of the electrode 21 is dependent upon both the rotational speed of the driving roller 20 and the angle at which it is inclined to the axis of the electrode, and it is adjusted or regulated in accordance with the rate of erosion or burning away of the electrode. Since in order to attain symmetrical erosion it suffices to keep the rotational speed of the electrode above a minimum value, it is enough for the regulation of the forward feeding either to keep the rotational speed of the driving roller constant and alter the offset angle of the roller 20, or to keep this angle constant and to alter the rotational speed above the minimum. Regulation can automatically be effected in accordance with the current or the voltage of the arc discharge, the forward feeding speed being lowered with increasing current or reducing voltage and increased with reducing current or increasing voltage.

A particularly simple regulator 32 is shown schematically in FIG. 4, which operates on the principle that unsymmetrical erosion is always accompanied by erosion in a longitudinal direction, that is to say wih a decrease of the discharge current (or an increase of the discharge voltage). Accordingly, an ammeter 34 is incorporated in the current supply 33 to the slip contact 24 of the electrode 21. If the current falls below a given value, the hand 35 of the ammeter 34 touches a contact 36. Through this and by means of a relay 37 the current circuit 38 of the geared motor 18 is closed, so that the electrode 21 rotates and is fed forward until the current has risen again. Instead of the ammeter for the arc current, it is possible to use a voltmeter for the arc voltage, the hand of which releases the drive of the geared motor when a given arc voltage is exceeded. Obviously, instead of this on-off control twopoint regulation (increase/decrease of the motor current) continuous regulation is possible.

Instead of the supporting rollers being disposed with their axes parallel to that of the electrode it is also possible to provide supporting rollers with their axes at right-angles to the longitudinal direction of the electrode or even fixed slip surfaces; which hold the bar-type electrode such that it is rotatable about its longitudinal axis and is axially displaceable. For example, it is possible for at least two freely-rotatable supporting rollers to support the electrode, each roller being provided with a V-shaped peripheral groove, and with their axes at right-angles to the longitudinal direction of the electrode, to be disposed one behind the other on the opposite side of the electrode to the driving roller. Alternatively, freely-rotatable supporting rollers can be disposed opposite the driving roller on both sides of the bar electrode, the axes of the supporting rollers running at right-angles to the longitudinal direction of the bar electrode, and such that the axes of rollers facing each other in contact with the electrode run in a V-shaped relation. In this way the electrode is movable in rotation with the slip friction and in regard to its forward feeding with rolling friction. Furthermore, it would also be possible for the bar electrode to be supported by spheres disposed at either side of it opposite to the driving roller, which spheres are rotatably supported for movement in all directions in seatings. This may be seen in FIG. 5. In that figure, 19 is the driving roller and 21 is the bar electrode. Spheres 50 support the electrode at points along the electrode surface. The spheres 50 are disposed in seats 51 which are mounted in appropriate supports 52. It is also possible for the bar electrode to be supported on two V-shaped slip surfaces disposed opposite the driving roller, each surface making a sliding line contact with the bar electrode. The embodiment is simpler than that described in relation to the drawing, but by comparison with that has slip friction both in relation to the axial movement and the rotational movement of the electrode. The embodiments with which the axes of the supporting rollers run at right-angles to the longitudinal direction of the electrode have the advantage by comparison to the embodiment example illustrated that the supporting rollers make only a point contact with the electrode. Against that is the disadvantage that more than two supporting rollers are necessary, in particular if the electrode has to be supported over the greater part of its length.

In another embodiment operating without slipping friction and with rolling friction only, the bar electrode is supported on a plurality of supporting rollers disposed opposite one another, the axes of the supporting rollers are inclined relative to the longitudinal axis of the bar electrode by the same angle and, viewed in the direction from the supporting roller concerned towards the electrode, in the same direction as the axis of the driving roller, so that with rolling friction on the supporting rollers the bar electrode executes a spiral movement.

In these other embodiments the surfaces making static frictional or transmissionally positive, contact with the driving roller and the points at which the bar electrode is rotatably and axially displaceably supported are, just as in the illustrated embodiment, preferably offset from one another by 120° approximately, with reference to the longitudinal axis of the bar electrode. Also in the case of the not illustrated embodiments the diameter of the driving roller is desirably greater than that of the bar electrode. The surfaces on which the electrode is supported are substantially harder and, when in contact with the bar electrode have a substantially smaller coefficient of friction than the elastically resilient covering surface of the driving roller.

What we claim is:

1. A device for feeding a cylindrical bar-type electrode into a plasma burner and simultaneously rotating said electrode comprising:

supporting means sustaining the electrode on two longitudinally extending and circumferentially spaced surface lines thereof and having two nondeformable surfaces which in contact with the electrode have a substantially low coefficient of friction;

a driving roller having its axis inclined at an acute angle to said surface lines of the electrode;

a surface layer on said driving roller which is elastically deformable and in contact with said electrode and has a coefficient of friction substantially higher than that of said surfaces of said supporting means;

means for urging said driving roller against said electrode sustained by said supporting means, thereby pushing the electrode partially into said elastically deformable high friction surface layer of said driving roller and providing a contact area between said layer and said electrode; and driving means connected with said driving roller for rotation thereof.

2. A device as claimed in claim 1, in which said electrode surface lines on which said supporting means sustain said electrode and said contact area between said driving roller surface layer and said electrode are angularly spaced by approximately 120° with reference to the longitudinal axis of the electrode.

3. A device as claimed in claim 1, wherein said surface of said supporting means consists essentially of steel and said surface layer of said driving roller consists of a rubber-like material.

4. A device as claimed in claim 1, wherein said surface of said supporting means consists essentially of polyacetal and said surface layer of said driving roller consists of a rubber-like material.

5. A device as claimed in claim 1, comprising means for adjusting the acute angle between the direction of the axis of the driving roller and the longitudinal axis direction of the electrode.

6. A device as claimed in claim 1, comprising electrical control means in a circuit with said plasma burner and said driving means for controlling the rotational speed thereof in dependence on the power consump- 7. A device as claimed in claim 1, in which said supporting means comprising two freely rotatable supporting rollers having axes arranged parallel to the longtitudinal axis direction of said electrode.

8. A device as claimed in claim 7, wherein the diameter of said driving roller is greater than the diameter of said electrode.

9. A device for feeding a cylindrical bar-type electrode into a plasma burner and simultaneously rotating said electrode, comprising:

supporting means sustaining the electrode along a plurality of spaced points along two longitudinally extending circumferentially spaced surface lines of said electrode, said supporting means including a plurality of spheres in seatings which are freely rotatable in all directions, said spheres having nondeformable surfaces which in contact with the electrode have a substantially low coefficient of friction;

a driving roller having its axis inclined at an acute angle to said surface lines of the electrode;

a surface layer on said driving roller which is electrically deformable and in contact with said electrode and has a coefficient of friction substantially higher than that of said surfaces of said supporting means;

means for urging said driving roller against said electrode sustained by said supporting means, thereby pushing the electrode partially into said elastically deformable high friction surface of said driving roller and providing a contact area between said roller and said electrode; and driving means connected with said driving roller for rotation thereof.

* * * * *